(12) United States Patent
Billich (10) Patent No.: US 11,007,830 B2
(45) Date of Patent: May 18, 2021

(54) METHOD FOR ASSISTING A HITCHING OPERATION

(71) Applicant: Deere & Company, Moline, IL (US)

(72) Inventor: Manuel Billich, Dischingen (DE)

(73) Assignee: DEERE & COMPANY, Moline, IL (US)

(*) Notice: Subject to any disclaimer, the term of this patent is extended or adjusted under 35 U.S.C. 154(b) by 317 days.

(21) Appl. No.: 16/115,146

(22) Filed: Aug. 28, 2018

(65) Prior Publication Data

US 2019/0111744 A1   Apr. 18, 2019

(30) Foreign Application Priority Data

Oct. 13, 2017   (DE) .......................... 102017218381.0

(51) Int. Cl.
| | |
|---|---|
| *B60D 1/36* | (2006.01) |
| *B60R 1/00* | (2006.01) |
| *B60D 1/62* | (2006.01) |
| *G05D 1/02* | (2020.01) |
| *B60D 1/00* | (2006.01) |
| *G01B 11/27* | (2006.01) |

(52) U.S. Cl.
CPC ................ *B60D 1/36* (2013.01); *B60D 1/62* (2013.01); *B60R 1/003* (2013.01); *G05D 1/0225* (2013.01); *B60D 2001/008* (2013.01); *B60R 2300/301* (2013.01); *B60R 2300/808* (2013.01); *G01B 11/272* (2013.01); *G05D 2201/0201* (2013.01)

(58) Field of Classification Search
CPC ..... B60D 1/36; B60R 1/003; B60R 2300/301; B60R 2300/808

See application file for complete search history.

(56) References Cited

U.S. PATENT DOCUMENTS

| | | | | |
|---|---|---|---|---|
| 5,729,194 A | * | 3/1998 | Spears ..................... | B60D 1/06 280/477 |
| 6,504,610 B1 | * | 1/2003 | Bauer ................. | G01B 11/272 356/399 |
| 7,057,498 B1 | * | 6/2006 | Cook ....................... | B60D 1/36 33/264 |
| 7,354,057 B2 | * | 4/2008 | Milner ..................... | B60D 1/36 280/477 |

(Continued)

FOREIGN PATENT DOCUMENTS

| | | |
|---|---|---|
| EP | 1238577 A1 | 9/2002 |
| WO | 9833103 A1 | 7/1998 |

OTHER PUBLICATIONS

European Search Report issued in counterpart application No. 18199569.7 dated Jan. 10, 2019. (6 pages).

(Continued)

*Primary Examiner* — Minnah L Seoh
*Assistant Examiner* — Michael R Stabley (57) ABSTRACT

A method for assisting a hitching operation between an agricultural utility vehicle and an implement to be attached thereto includes providing a vehicle side first laser unit and a vehicle side second laser unit, generating a first vertical light fan by the vehicle side first laser unit, and generating a second vertical light fan by the vehicle side second laser unit. The first and second vertical light fans are aligned with a hitching point or a reference point that characterizes the hitching point on the implement for carrying out the hitching operation.

16 Claims, 5 Drawing Sheets

(56) References Cited

U.S. PATENT DOCUMENTS

| | | | |
|---|---|---|---|
| 7,391,303 B2 * | 6/2008 | Ball | B60D 1/36 |
| | | | 280/477 |
| 7,396,035 B1 | 7/2008 | Smith | |
| 2002/0125018 A1 * | 9/2002 | Bernhardt | A01B 59/068 |
| | | | 172/439 |
| 2005/0057345 A1 * | 3/2005 | Johnson | B60D 1/36 |
| | | | 340/431 |
| 2006/0261574 A1 | 11/2006 | Milner et al. | |
| 2006/0267745 A1 | 11/2006 | Larson | |
| 2010/0212170 A1 | 8/2010 | Marsee | |

OTHER PUBLICATIONS

German Search Report issued in counterpart application No. 102017218381.0 dated Jun. 28, 2018. (10 pages).

\* cited by examiner

METHOD FOR ASSISTING A HITCHING OPERATION

RELATED APPLICATIONS

This application claims priority to German Patent Application Ser. No. 102017218381.0, filed Oct. 13, 2017, the disclosure of which is hereby incorporated by reference in its entirety.

FIELD OF THE DISCLOSURE

The present disclosure relates to a method for assisting a hitching operation between an agricultural utility vehicle and an implement to be hitched thereto.

BACKGROUND

A system that assists a driver in hitching a trailer to a vehicle is disclosed in U.S. Publication No. 2010/0212170 A1. The system comprises three point light sources that generate a light pattern on a reflecting surface of the trailer that is to be hitched so that it converges into a single point of light as soon as the trailer is in a position relative to the vehicle that is appropriate for hitching.

A use of the known system is primarily suitable in the automobile sector. Under unfavorable local conditions such as typically arise in the agricultural sector, however, there is the possibility that the points of light cannot be seen or are only poorly seen on the surface of the attachment that is to be hitched because of dirt or interference in the line of sight.

Therefore, there is a need for a method for hitching that has been adapted for use with agricultural utility vehicles.

SUMMARY

In a first embodiment of the present disclosure, a method for assisting a hitching operation between an agricultural utility vehicle and an implement to be hitched to it provides that a first vertical light fan is generated by means of a vehicle-side first laser unit and a second vertical light fan is generated by means of a vehicle-side second laser unit, where the vertical light fan is brought into alignment with a hitching point or a reference point that characterizes the hitching point on the implement in order to carry out the hitching operation.

The vertical light marking projected in this way along the ground and in the region of the hitching point or reference point on the implement allows a position of the reference point or hitching point that is to be taken or gauged relative to a corresponding reference point or hitching point on the agricultural utility vehicle to be made visually detectable even under unfavorable conditions by targeting the reference point or hitching point on the implement in order to conduct the hitching operation. The vertical light marking can in this respect serve as a light or gauging beam that is easily seen by the eye. For this, the two laser units operate in the visible wavelength range, and are common line lasers, which project a linear light marking in the vertical direction onto surrounding surfaces.

In particular, it is possible that the two vertical light fans are aimed so that the first vertical light fan coincides with a midline axis of the agricultural utility vehicle and the second vertical light fan runs offset and parallel to the first vertical light fan through a hitching point of the agricultural utility vehicle that is at a distance from the first light fan.

In this case, the implement to be attached to a three-point hitch of an agricultural utility vehicle designed as a tractor can have two, right and left, lower hitching points and one central upper hitching point. The two vertical light fans are first directed toward the implement to be hitched by the appropriate maneuvering of the agricultural utility vehicle so that the vertical light marking projected by the first vertical light fan coincides with a central reference point on the implement such as, for example its central upper hitching point. Here, from an offset of the vertical light marking projected by the second vertical light fan with respect to the relevant lower hitching point, one can visually determine the degree to which the lower hitching point is out of position and thus (because of their fixed spatial relationship to each other) in the end also that of the upper hitching point with respect to the corresponding hitching points on the agricultural utility vehicle. To carry out the hitching operation, the operator of the agricultural utility vehicle then need only maneuver in terms of a reduction of the visual offset, so that the vehicle is guided directly into the end position intended for hitching the implement.

The described procedure can also be used with reduced functionality for hitching an implement equipped with a single central hitching point, for example, a trailer with a tow bar, by using the vertical white marking projected by the first vertical light fan along the midline axis as an orientation aid in carrying out the hitching operation. In this case, the agricultural utility vehicle is maneuvered so that the hitching point always remains in alignment with the vertical light marking. In such a case, the reference point and hitching point coincide in position.

It is also conceivable that the first or second vertical light fan can be pivoted about a relevant vertical axis by means of a positioning device.

The actuation of the positioning device, which consists of a first and second electrical positioning motor, takes place, for example, manually by means of an operator unit that is situated in a driver cabin of the agricultural utility vehicle. The pivot angle that is thus set by controlling the electric positioning motors in this case refers to an angle between the direction of the relevant vertical light fan and the midline axis of the agricultural utility vehicle or a lengthwise axis running parallel to it. In this case, the pivot angle is always 0 degrees if the first vertical light fan aligns with the midline axis or the second vertical light fan aligns with the lengthwise axis that runs parallel to it.

It is possible that the two vertical light fans are brought into alignment at the reference point or hitching point on the implement by controlling the electric positioning motors, where the relevant pivot angles of the vertical light fans are detected and, from this, a trajectory to be followed by the agricultural utility vehicle for hitching the implement is calculated.

The parallax arising between the two vertical light fans allows an exact characterization of the position of the hitching points on the implement with respect to the corresponding attachment points on the agricultural utility vehicle. In the case of an implement equipped with left and right lower hitching points and a central upper hitching point, the detection of the pivot angle is first carried out for a reference point, for example, the central upper hitching point, and then for one of the lower hitching points, in order to determine the corresponding trajectory on the basis of a modified calculation.

The trajectory to be traversed can be projected on the ground by means of the vertical light fans by controlling the two electric positioning motors.

The visualization of the trajectory to be traversed makes it easier for the operator to drive the agricultural utility vehicle into the end position intended for hitching the implement. While maneuvering, he need only take care that the vertical light marking projected by the two vertical light fans in their convergence or intersecting region coincides with the reference point or hitching point on the implement. The calculation of the trajectory in this case is updated at preset time intervals so as to take into account possible deviations due to driving conditions.

Since the course of the trajectory projected on the ground may not be completely visible from the driver's seat, it is advantageous if it is registered by means of a camera and reproduced on a display device of an operator interface.

A camera can be situated in the front or rear region of the agricultural utility vehicle, in the case of a tractor, for example, to register the trajectory projected on the ground, including the hitching points associated with the tractor, thus a three-point hitch, a pick-up hitch, a ball hitch, a jaw coupler, or the like.

On the other hand, there is the possibility that a speed-dependent steering angle to be adopted at the steerable wheels of the agricultural utility vehicle is derived from the calculated trajectory.

The steering angle is affected via a steering handle in the form of a steering wheel that is provided in a driver cabin of the agricultural utility vehicle or by means of an autonomous steering device, such as is provided in many agricultural utility vehicles for carrying out a GPS-controlled operation. While the hitching operation is being carried out, the speed of travel can either be specified manually by the operator or as part of an automated hitching assist function linked to the method according to the invention, independent of the operator.

In this case, it is conceivable that visual, acoustic, or haptic steering recommendations are output via the operator interface on the basis of the derived steering angle, or the steering angle is set in dependence on speed by controlling the autonomous steering device after initiation of the automated hitching assist function, independent of the operator.

The steering recommendations are presented, for example, visually via the operator interface in the form of symbols or plain text instructions, in addition to an output of signal tones which are modulated in dependence on a deviation from the trajectory to be traversed, or even a haptic feedback connection to the steering handle can be provided. In the latter case, the operator interface can have a torque generator that interacts with the steering handle, by means of which a steering resistance that counteracts a deviation from the trajectory to be traversed is produced at the steering handle.

Hampered visibility of the trajectory to be traversed or the reference point or hitching points on the implement can also be taken into account by detecting the first or second vertical light fan by means of a sensor located at the reference point or hitching point of the implement and being visualized by the display device that comprises the operator interface. The information made available by the sensor system in this case is transmitted to the operator interface via a wireless data exchange connection, where the sensor system is, for example, an array of light-sensitive semiconductor elements that detect the brightness distribution of the incident light.

BRIEF DESCRIPTION OF THE DRAWINGS

The above-mentioned aspects of the present disclosure and the manner of obtaining them will become more apparent and the disclosure itself will be better understood by reference to the following description of the embodiments of the disclosure, taken in conjunction with the accompanying drawings, wherein.

Corresponding reference numerals are used to indicate corresponding parts throughout the several views.

DETAILED DESCRIPTION

The embodiments of the present disclosure described below are not intended to be exhaustive or to limit the disclosure to the precise forms disclosed in the following detailed description. Rather, the embodiments are chosen and described so that others skilled in the art may appreciate and understand the principles and practices of the present disclosure.

Figure 1:
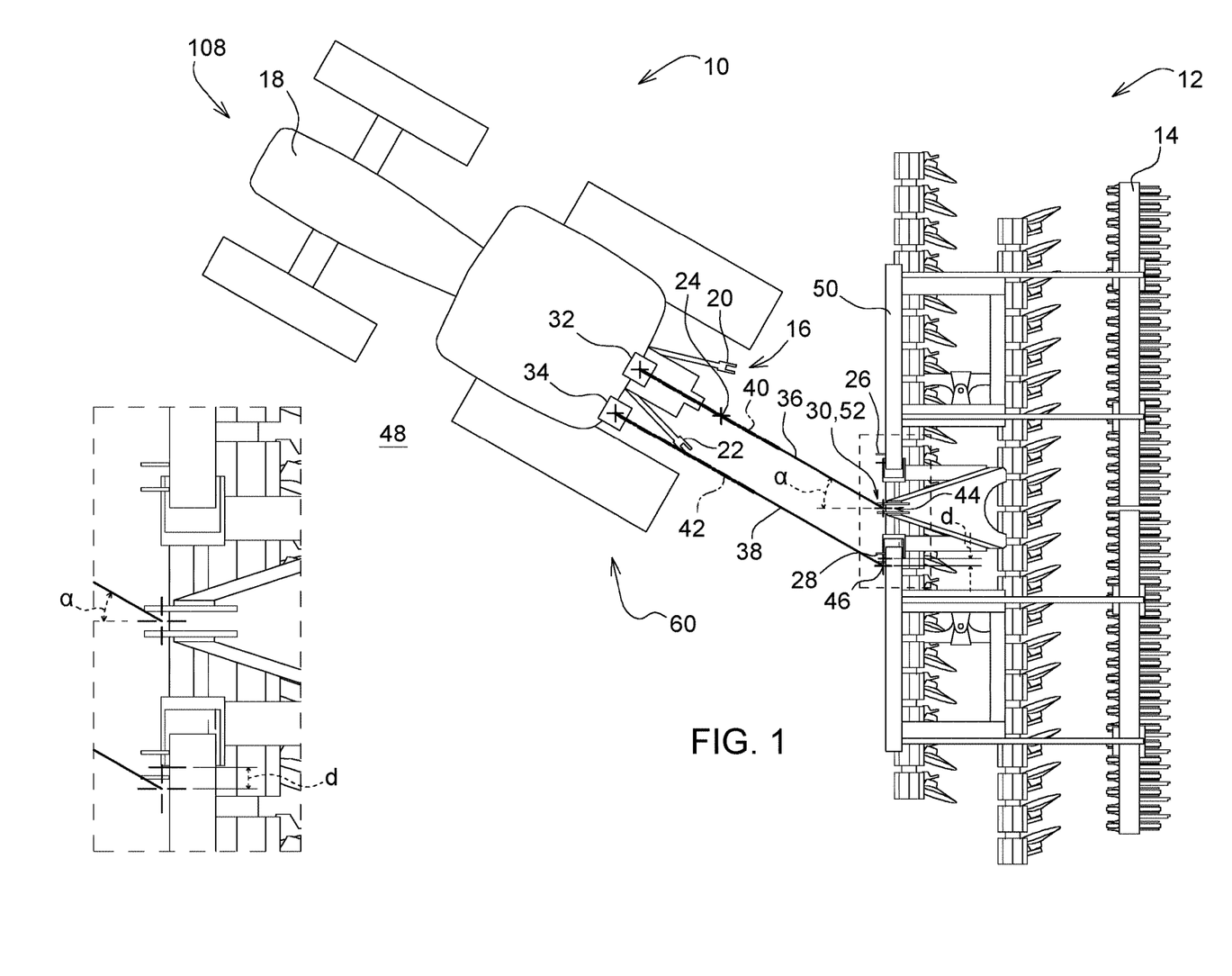
FIG. 1 is a schematic of one embodiment of a method for hitching an implement to an agricultural utility vehicle designed as a harrow.

FIG. 1 illustrates the functioning of a first embodiment of a method for assisting a hitching operation between an agricultural utility vehicle 10 and an implement 12 that is to be attached to it.

In this case, the implement 12 is a harrow 14, which is to be hitched to a rear three-point hitch 16 of an agricultural utility vehicle 10 designed as a tractor 18. The three-point hitch 16 includes right and left lower attachment points 20, 22, and a central upper attachment point 24. The points correspond in position and geometry to the relevant hitching points 26, 28, 30 on the implement 12.

First and second laser units 32, 34 are each firmly mounted in the region of the three-point hitch 16 of the agricultural utility vehicle 10, where a first vertical light fan 36 is generated by the first laser unit 32 and a second vertical light fan 38 is generated by the second laser unit 34. As can be seen from FIG. 1, the first vertical light fan 36 coincides with a midline axis 40 of the agricultural utility vehicle 10. The second vertical light fan 36, on the other hand, runs offset and parallel to it through the left lower attachment point 22 of the three-point hitch 16, and also along a lengthwise axis 42.

The two laser units 32, 34 operate in the visible wavelength range, and are common line lasers, which project a linear line marking 44, 46 in the vertical direction onto the surrounding surfaces, in this case along the ground 48 and a mounting frame 50 comprising the implement 12. The two vertical light fans 36, 38 are initially aimed toward the implement 12 that is to be hitched by the appropriate maneuvering of the agricultural utility vehicle 10. Here, the vertical light marking 44 projected by the first vertical light fan 36 coincides with a central reference point 52 on the implement 12, where, from an offset d of the vertical light marking 46 projected by the second vertical light fan 38 with respect to the left lower hitching point 28, one can draw a conclusion relative to the degree a to which the hitching point 28 is out of position and thus (because of their fixed spatial relationship to each other) in the end also with respect to the other hitching points 26, 30 with respect to the corresponding attachment points 20, 22, 24 on the agricultural utility vehicle 10. To carry out the hitching operation, the operator only needs to maneuver the agricultural utility vehicle 10 in terms of reducing the visible offset d ($\alpha \rightarrow 0$), so that it is guided directly into the end position intended for hitching the implement 12.

Figure 2:
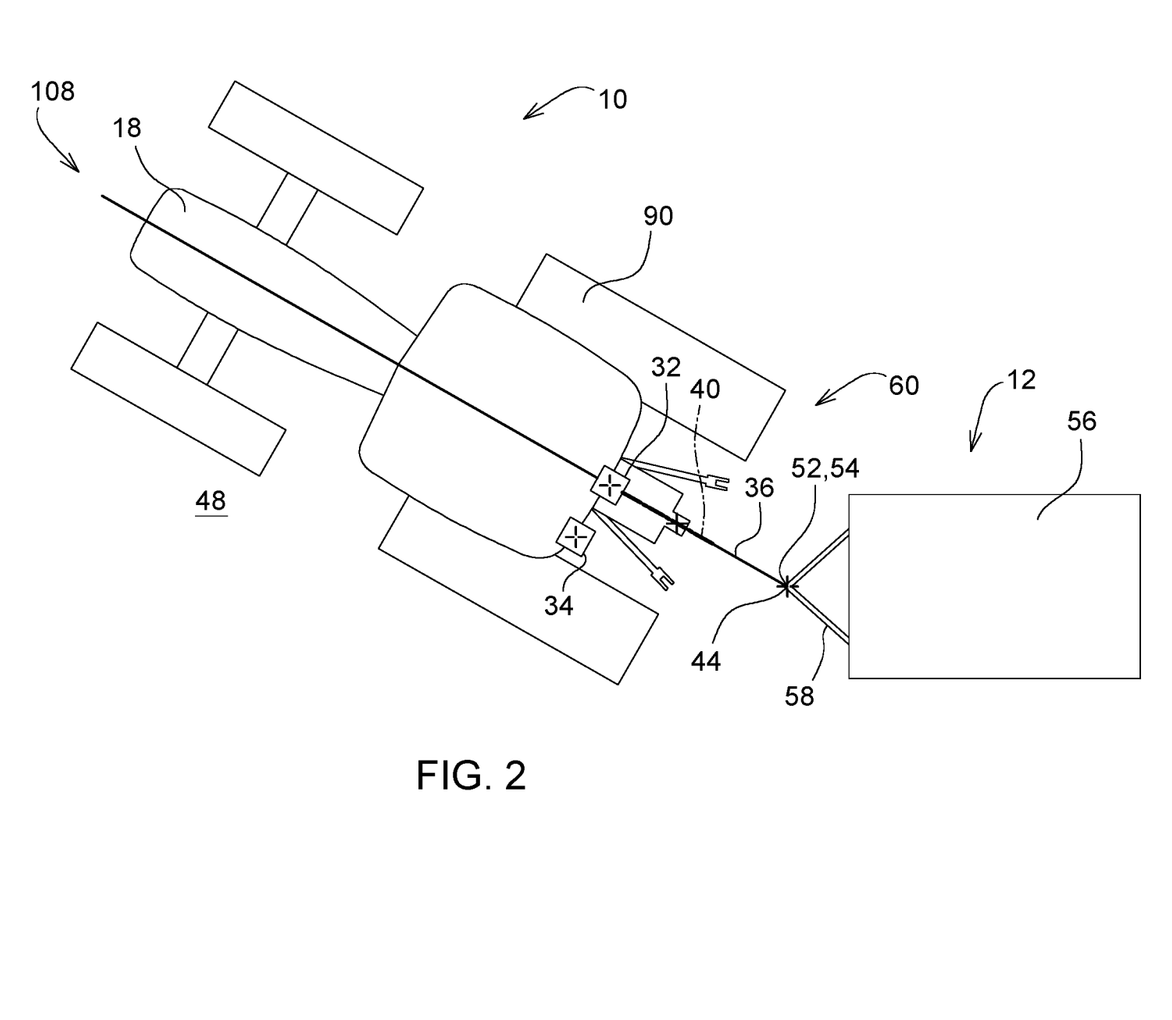
FIG. 2 is a schematic of the embodiment of FIG. 1 of a method for hitching an implement to an agricultural utility vehicle designed as a trailer.

In correspondence with the representation in FIG. 2, the method described above can also be used with reduced functionality for hitching an implement 12 designed with a single central hitching point 54, here a trailer 56 with a tow bar 58, by using the vertical line marking 44 projected by the first vertical light fan 36 along the midline axis 40 as an orientation aid in carrying out the hitching operation. In this case, the agricultural utility vehicle 10 is maneuvered so that the hitching point 54, which simultaneously forms the reference point 52 that is to be visualized by means of the light marking 44, always remains in alignment with the vertical light marking 46. The hitching point 54 here is designed to be attached to a ball and socket hitch or a jaw coupler in the rear region 60 of the agricultural utility vehicle 10. In order to avoid undesirable glare to external parties, the second laser unit 34, which is not needed, is switched off.

Figure 3:
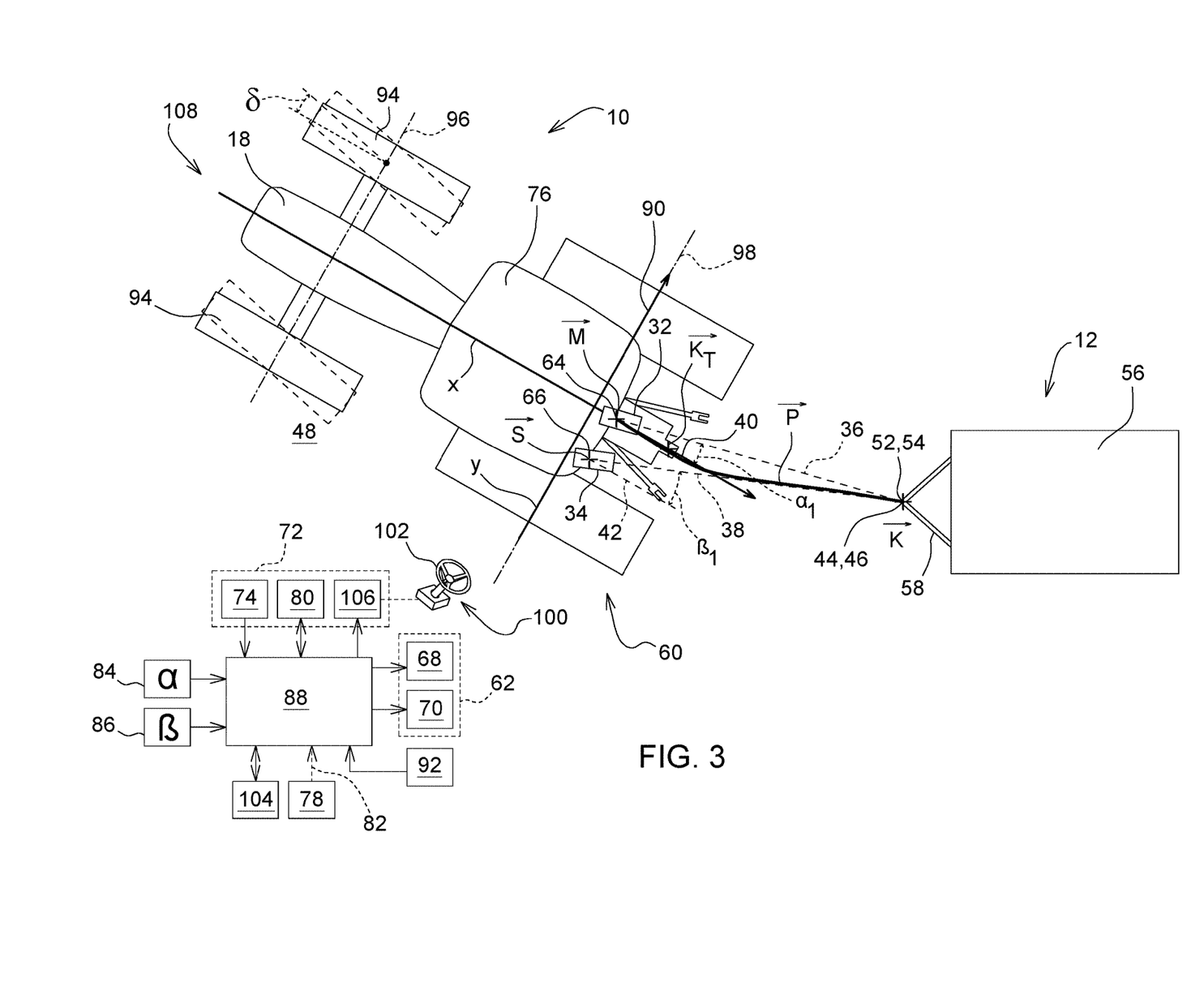
FIG. 3 is a schematic of a second embodiment of a method for hitching an implement designed as a trailer.

FIG. 3 illustrates the functioning of a second embodiment of the method, which is characterized by improved assistance to the operator or driver in maneuvering the agricultural utility vehicle 10 by comparison with the first embodiment.

The important difference from the first embodiment is that the two vertical light fans 36, 38 do not, for instance, have a fixed orientation or beam direction, but rather can be pivoted about a relevant vertical axis 64, 66 by a positioning device 62.

The actuation of the positioning device 62, which consists of a first and a second electrical positioning motor 68, 70, takes place manually in this case via an operator unit 74 consisting of an operator interface 72, which is located in a driver cabin 76 of the agricultural utility vehicle 10. According to FIG. 3, the pivot angle $\alpha_1$, $\beta_1$ that can be preset in such a way refers to an angle between the direction of the relevant vertical light fan 36, 38 and the midline axis 40 or the lengthwise axis 42 of the agricultural utility vehicle 10 running parallel to it. Here, each pivot angle $\alpha_1$, $\beta_2$ is 0 degrees if the first vertical light fan 36 aligns with the midline axis 40 or the second vertical light fan 38 aligns with the lengthwise axis 42 that runs parallel to it.

To conduct the hitching operation, the operator first aims the light markings 44, 46 projected by the two vertical light fans 36, 38 at the hitching point 54 of the implement 12, which takes place through the appropriate actuation of the positioning device 62 via the operator unit 74. The implement 12 can be a trailer 56 with a tow bar 58, so that here, too, a single central hitching point 54 is envisioned.

The two vertical light fans 36, 38 are brought into alignment at the hitching point 54 on the tow bar 58. Whether or not this is the case is detected either visually by the operator or by means of a sensor system 78 located at the hitching point 54 and visualized on a display device 80 comprising the operator interface 72. The information made available by the sensor system 78 is in this case transmitted from the implement 12 to the operator interface 72 via a wireless data transfer connection 82, where the sensor system 78 is an array of light-sensitive semiconductor elements that register the brightness distribution of the incident light.

Then, the relevant pivot angles $\alpha_1$, $\beta_2$ are determined by means of first and second angle sensors 84, 86 and sent to a control unit 88 for evaluation. The control unit 88 calculates on this basis a trajectory $\vec{P}$ to be traversed by agricultural utility vehicle 10 in order to hitch the implement 12:

$$\vec{P}(s_p) = \begin{pmatrix} \frac{K_x - K_{Tx} - s_1}{s_1^2} s_p^2 + s_p + K_{Tx} \\ \frac{K_y}{s_1^2} s_p^2 \end{pmatrix} \forall s_1 = |\overrightarrow{K_T K}| \wedge s_p = [0; s_1]$$

where $$\vec{K} = \begin{pmatrix} K_x \\ K_y \end{pmatrix} = \vec{S} + k \begin{pmatrix} \cos(\beta_1) \\ \sin(\beta_1) \end{pmatrix} \forall k = \frac{\tan(\alpha_1)(S_x - M_x) - S_y - M_y}{\sin(\beta_1) - \tan(\alpha_1)\cos(\beta_1)},$$

where all of the coordinates $\vec{P}$, $\vec{K}$, $\vec{K}_T$, $\vec{M}$, $\vec{S}$ refer to a vehicle-fixed frame of reference system 90. The parameter $s_p$ here represents the discrete parameterization of the arc length s, $s_p = f(s)$.

The trajectory $\vec{P}$ to be traversed is projected onto the ground 48 by means of the two vertical light fans 36, 38 by the control unit 88 by controlling the electric positioning motors 68, 70, which comprise the positioning device 62.

The visualization of the trajectory $\vec{P}$ to be traversed makes it easier for the operator to guide the agricultural utility vehicle 10 into the end position envisioned for hitching the implement 12. During maneuvering, the operator need merely keep in mind that the vertical light marking 44, 46 projected by the two vertical light fans 36, 38 in their intersecting or crossing region coincide with the reference point 52 on the implement 12, which in this case is given by the hitching point 54.

Since the course of the trajectory $\vec{P}$ projected on the ground is usually not completely visible from the driver's seat, it is registered by means of a camera 92, including the attachment points 20, 22, 24 provided on the agricultural utility vehicle 10, and reproduced on the display device 80 of the operator interface 72. The camera 92 is located, for example, in the rear region 60 of the agricultural utility vehicle 10.

Since the position of the agricultural utility vehicle 10 with respect to the hitching point 54 of the implement 12 is continuously changing during maneuvering, an updated trajectory $\vec{P}$ is calculated by the control unit 88 at regular time intervals $T_s$:

$$\vec{P} = \begin{bmatrix} \cos\left(\frac{T_s \tan(\delta) v}{l}\right) & \sin\left(\frac{T_s \tan(\delta) v}{l}\right) \\ -\sin\left(\frac{T_s \tan(\delta) v}{l}\right) & \cos\left(\frac{T_s \tan(\delta) v}{l}\right) \end{bmatrix} \begin{pmatrix} P_x z^{-1} - T_s v \\ P_y z^{-1} \end{pmatrix}.$$

In this case, the parameter $\delta$ indicates a steering angle that has been set at the steerable wheels 94 of the agricultural utility vehicle 10, l designates a lengthwise distance between a front and rear axle 96, 98 of the agricultural utility vehicle 10, v designates the speed of the agricultural utility vehicle 10, and $P_x z^{-1}$, $P_y z^{-1}$ are the coordinates of the trajectory from the calculation conducted above, indicated with $z^{-1}$.

Figure 4:
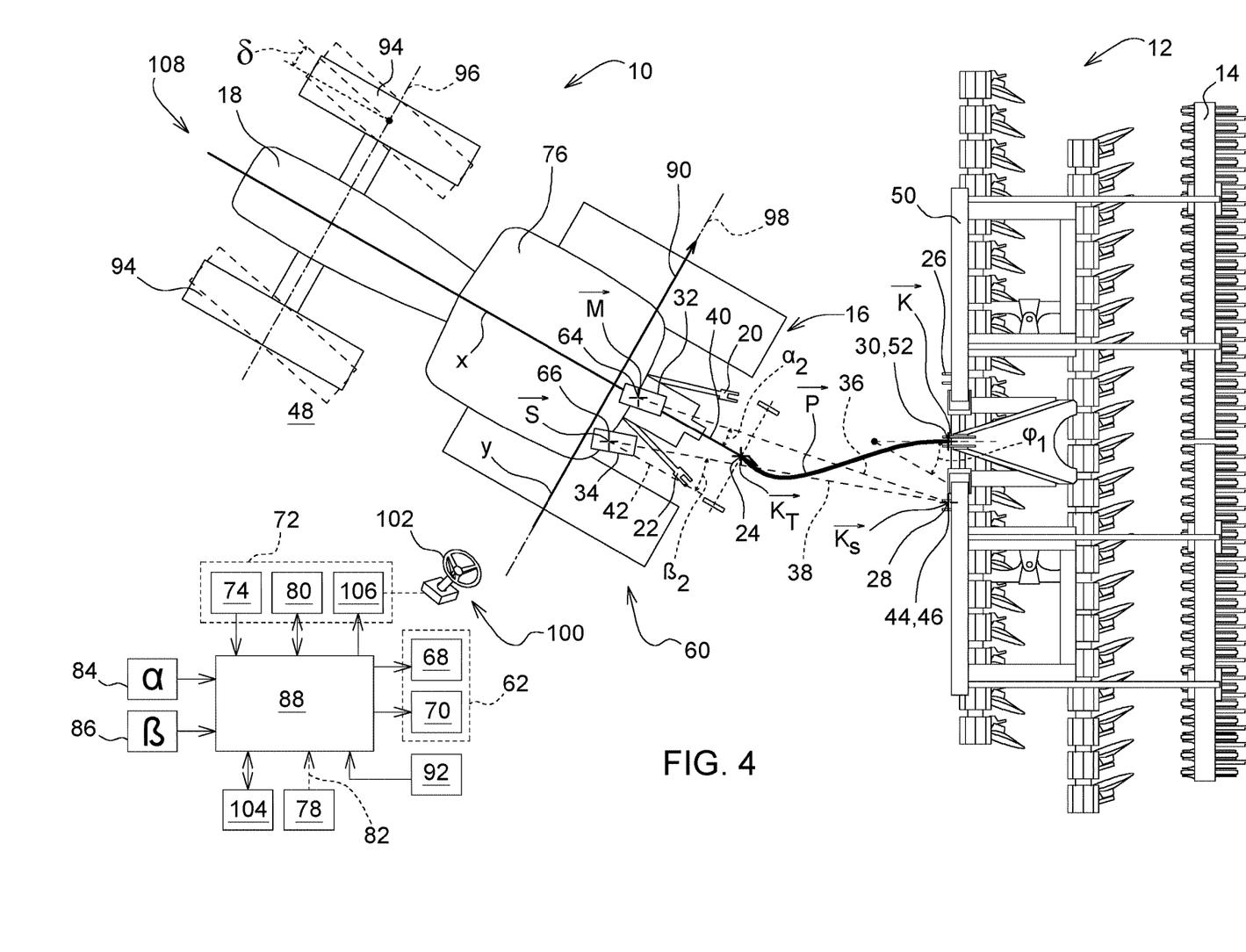
FIG. 4 is a schematic of the embodiment of FIG. 3 of a method for hitching an implement to an agricultural utility vehicle designed as a harrow.

FIG. 4 illustrates the functioning of the second method for an implement 12 to be hitched to the three-point hitch 16 of the agricultural utility vehicle 10, in this case a harrow 14.

To carry out the hitching operation, the operator first directs the light markings 44, 46 projected by the two vertical light fans 36, 38 onto the reference point 52 of the implement 12 that is formed by the central upper hitching point 30, which takes place through the appropriate actuation of the positioning device 62 via the operator unit 74.

Then, the left lower hitching point 28 is targeted by the user by aiming the light markings 44, 46 projected by the two vertical light fans 36, 38 onto it. Then, the relevant pivot angles angle $\alpha_2$, $\beta_2$ are registered by means of the two angle sensors 84, 86 so as to determine the trajectory $\vec{P}$ that is now to be traversed on the basis of a modified calculation:

$$\vec{P}(s_p) = \begin{pmatrix} \frac{-2K_x + \cos(\varphi_1)s_1 + s_1 + 2K_{Tx}}{s_1^3} s_p^3 + \\ \frac{3K_x - \cos(\varphi_1)s_1 - 2s_1 - 3K_{Tx}}{s_1^2} s_p^2 + s_p + K_{Tx} \\ \frac{-2K_y + \sin(\varphi_1)s_1}{s_1^3} s_p^3 + \frac{3K_x - \sin(\varphi_1)s_1}{s_1^2} s_p^2 \end{pmatrix}$$

$$\forall s_1 = |\overrightarrow{K_T K}| \wedge s_p = [0; s_1] \wedge \varphi_1 = \arctan\left(\frac{K_x - K_{Sx}}{K_{Sy} - K_y}\right) \text{ where}$$

$$\overrightarrow{K_S} = \begin{pmatrix} K_{Sx} \\ K_{Sy} \end{pmatrix} = \vec{S} + k_s \begin{pmatrix} \cos(\beta_2) \\ \sin(\beta_2) \end{pmatrix}$$

$$\forall k_s = \frac{\tan(\alpha_2)(S_x - M_x) - S_y - M_y}{\sin(\beta_2) - \tan(\alpha_2)\cos(\beta_2)},$$

where the coordinates $\overrightarrow{K_S}$ refer to the vehicle-fixed frame of reference system 90.

The trajectory $\vec{P}$ to be traversed is also projected onto the ground 48 here by the control unit 88 by controlling the positioning motors 68, 70 comprising the positioning system 62 by means of the two vertical light fans 36, 38, where the trajectory $\vec{P}$ is updated by the control unit 88 at regular time intervals $T_s$:

$$\vec{P} = \begin{bmatrix} \cos\left(\frac{T_s \tan(\delta)v}{l}\right) & \sin\left(\frac{T_s \tan(\delta)v}{l}\right) \\ -\sin\left(\frac{T_s \tan(\delta)v}{l}\right) & \cos\left(\frac{T_s \tan(\delta)v}{l}\right) \end{bmatrix} \begin{pmatrix} P_x z^{-1} - T_s v \\ P_y z^{-1} \end{pmatrix}.$$

Optionally, a speed-dependent steering angle $\delta$ to be adopted at the steerable wheels 94 of the agricultural utility vehicle 10 is derived from the trajectory $\vec{P}$ calculated in connection with FIG. 3 or 4. For this, the trajectory to be traversed is first parameterized discretely via the arc length s by the control unit (see FIG. 5), $s_p = f(s)$, $$s_p(n) = \begin{cases} s = sz^{-1} + \frac{T_s}{2}(vz^{-1} + v) \forall s(0) = 0, \\ \sum_{i=1}^{n} \sqrt{[P_x(\Delta s_p i) - P_x(\Delta s_p (i-1))]^2 + [P_y(\Delta s_p i) - P_y(\Delta s_p (i-1))]^2} \\ \exists ! n : s_p(n) \le s \wedge s_p(n+1) > s. \end{cases}$$

Figure 5:
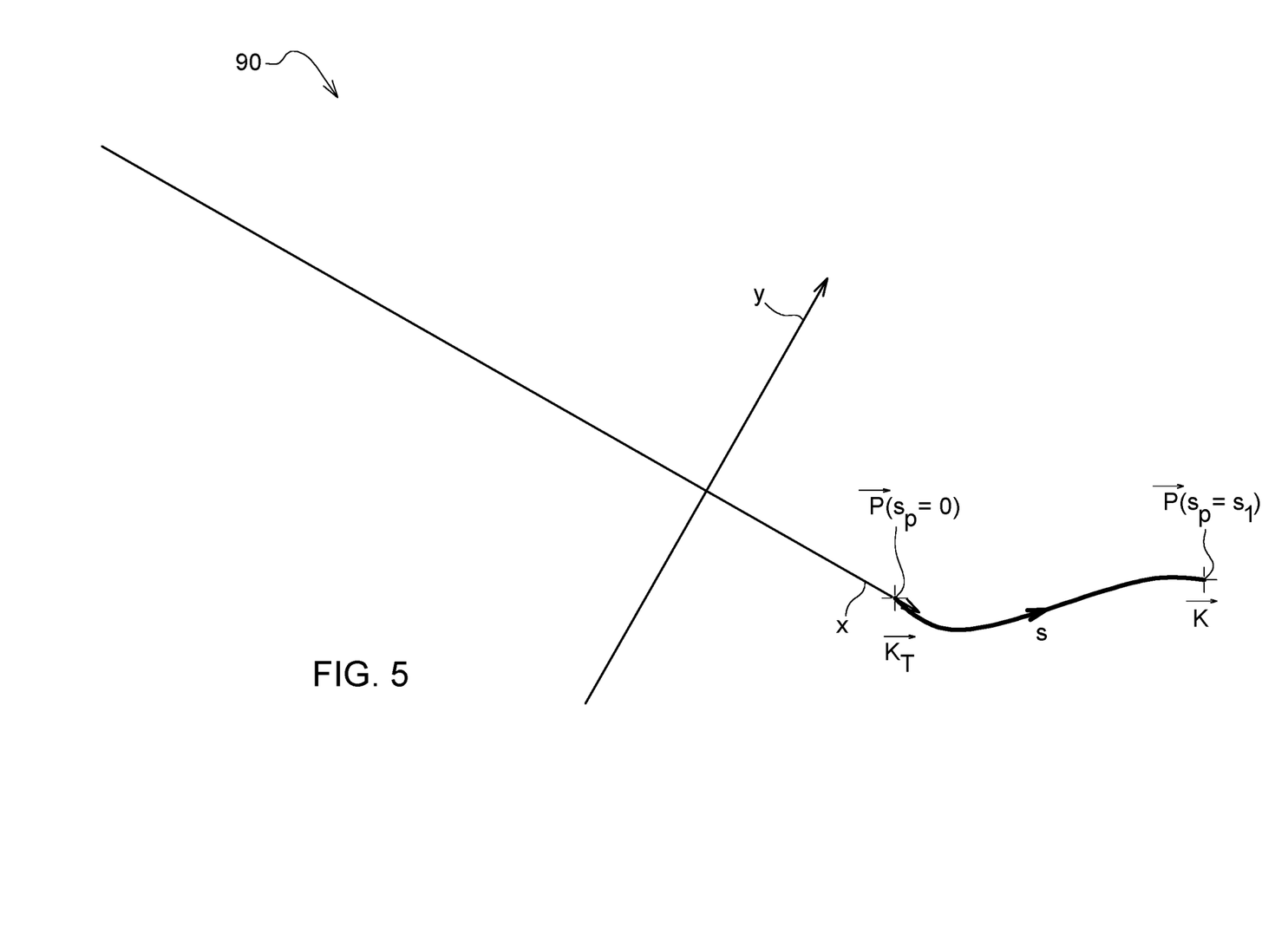
FIG. 5 is a schematic of a trajectory to be traversed by an agricultural utility vehicle in the hitching of the implement as in FIG. 3 or 4, parameterized by an arc length s.

From this, the steering angle $\delta$ to be set becomes $$\delta = \arctan\left(l \frac{\frac{\partial P_x}{\partial s_p} \frac{\partial^2 P_y}{\partial^2 s_p} - \frac{\partial P_y}{\partial s_p} \frac{\partial^2 P_x}{\partial^2 s_p}}{\sqrt{\left(\frac{\partial P_x}{\partial s_p}\right)^2 + \left(\frac{\partial P_y}{\partial s_p}\right)^2}}\right).$$

The steering angle $\delta$ is affected via a steering handle 100 in the form of a steering wheel 102, which is provided in the driver cabin 76 of the agricultural utility vehicle 10, by means of an autonomous steering device 104, which is provided for carrying out a GPS-controlled operation of the agricultural utility vehicle 10. While carrying out the hitching operation, the speed of travel v is either preset manually by the operator or by an automatic hitch assistance function linked to the method according to the invention, independent of the operator.

Based on the derived steering angle $\delta$, visual, acoustic, or haptic steering recommendations can then be output via the operator interface 72, or the steering angle $\delta$ is set in dependence on the speed by control of the autonomous steering device 104 after initiation of the automatic hitch assistance function, independent of the operator.

The steering recommendations are represented visually via the display device 80 of the operator interface 72 in the form of symbols or plain text instructions, in addition, output of signal tones, which are modulated in dependence on a deviation from the trajectory to be traversed, is provided or a connection of a haptic feedback at the steering handle 100 is provided. In the latter case, the operator interface 72 has a torque generator 106 that interacts with the steering handle 100, by means of which a steering resistance that counteracts a deviation from the trajectory to be traversed is formed at the steering handle 100.

The implements 12 shown in FIGS. 1 to 4 are intended only to have the nature of examples, the method is likewise well suited for any other implement or attachment 12 that can be attached to an individual attachment point or to a three-point hitch 16. Implements or attachments 12 that can be hitched to a two-point hitch of the agricultural utility vehicle 10 are also conceivable.

For the sake of completeness, it should be noted that the methods described herein for hitching any implement 12 can be used not only in the rear region 60 of the agricultural utility vehicle 10 but also just as well in the front region 108.

While exemplary embodiments incorporating the principles of the present disclosure have been disclosed hereinabove, the present disclosure is not limited to the disclosed embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A method for assisting a hitching operation between an agricultural utility vehicle and an implement to be attached thereto, comprising:
    providing a vehicle side first laser unit and a vehicle side second laser unit;
    generating a first vertical light fan by the vehicle side first laser unit;
    generating a second vertical light fan by the vehicle side second laser unit;

aligning the first and second vertical light fans with a hitching point or a reference point that characterizes the hitching point on the implement for carrying out the hitching operation;

pivoting the first or second vertical light fan about a relevant vertical axis;

converging the two vertical light fans at the reference point or hitching point on the implement;

registering relevant pivot angles of the vertical light fans; and calculating a trajectory based on the relevant pivot angles to be traversed for hitching the agricultural utility vehicle.

2. The method of claim 1, further comprising aiming the two vertical light fans so that the first vertical light fan coincides with a midline axis of the agricultural utility vehicle and the second vertical fan runs parallel and offset to it through a hitching point of the agricultural utility vehicle that is spaced at a distance from it.

3. The method of claim 1, further comprising projecting the trajectory to be traversed onto a ground by the two vertical light fans.

4. The method of claim 3, wherein the trajectory projected on the ground is registered by a camera and reproduced on a display device of an operator interface.

5. The method of claim 1, further comprising deriving a vehicle speed-dependent steering angle that is to be adopted at a steerable wheel of the agricultural utility vehicle from the calculated trajectory.

6. The method of claim 5, further comprising:
outputting on the basis of the derived steering angle visual, acoustic, or haptic steering recommendations via an operator interface, or
setting the steering angle in dependence on a vehicle speed through control of an autonomous steering device independent of the operator.

7. The method of claim 1, further comprising registering the first or second vertical light fans by a sensor system located at the reference point or hitching point of the implement and visualized on a display device comprised by an operator interface.

8. A method for assisting a hitching operation between an agricultural utility vehicle and an implement to be attached thereto, comprising:
providing a vehicle side first laser unit and a vehicle side second laser unit;
generating a first vertical light fan by the vehicle side first laser unit;
generating a second vertical light fan by the vehicle side second laser unit;
aligning the first and second vertical light fans with a hitching point or a reference point that characterizes the hitching point on the implement for carrying out the hitching operation;
pivoting the first or second vertical light fan about a relevant vertical axis;
aiming the two vertical light fans so that the first vertical light fan coincides with a midline axis of the agricultural utility vehicle and the second vertical fan runs parallel and offset to it through a hitching point of the agricultural utility vehicle that is spaced at a distance from it;
converging the two vertical light fans at the reference point or hitching point on the implement;
registering relevant pivot angles of the vertical light fans; and
calculating a trajectory based on the relevant pivot angles to be traversed for hitching the agricultural utility vehicle.

9. The method of claim 8, further comprising projecting the trajectory to be traversed onto a ground by the two vertical light fans.

10. The method of claim 9, wherein the trajectory projected on the ground is registered by a camera and reproduced on a display device of an operator interface.

11. The method of claim 8, further comprising deriving a vehicle speed-dependent steering angle that is to be adopted at a steerable wheel of the agricultural utility vehicle from the calculated trajectory.

12. The method of claim 11, further comprising:
outputting on the basis of the derived steering angle visual, acoustic, or haptic steering recommendations via an operator interface, or
setting the steering angle in dependence on a vehicle speed through control of an autonomous steering device independent of the operator.

13. The method of claim 8, further comprising registering the first or second vertical light fans by a sensor system located at the reference point or hitching point of the implement and visualized on a display device comprised by an operator interface.

14. A method for assisting a hitching operation between an agricultural utility vehicle and an implement to be attached thereto, comprising:
providing a vehicle side first laser unit and a vehicle side second laser unit;
generating a first vertical light fan by the vehicle side first laser unit;
generating a second vertical light fan by the vehicle side second laser unit;
aligning the first and second vertical light fans with a hitching point or a reference point that characterizes the hitching point on the implement for carrying out the hitching operation;
pivoting the first or second vertical light fan about a relevant vertical axis;
converging the two vertical light fans at the reference point or hitching point on the implement;
registering relevant pivot angles of the vertical light fans; and
calculating a trajectory based on the relevant pivot angles to be traversed for hitching the agricultural utility vehicle.

15. The method of claim 14, further comprising projecting the trajectory to be traversed onto a ground by the two vertical light fans.

16. The method of claim 15, wherein the trajectory projected on the ground is registered by a camera and reproduced on a display device of an operator interface.

* * * * *